United States Patent [19]

Ali-Safai et al.

[11] Patent Number: 5,475,503
[45] Date of Patent: Dec. 12, 1995

[54] ROLLER FOR OPTICAL SCANNER

[75] Inventors: Mohammad Ali-Safai; Paul Huang, both of San Jose; Harry R. Duer, Boulder Creek, all of Calif.

[73] Assignee: Logitech, Inc., Fremont, Calif.

[21] Appl. No.: 193,334

[22] Filed: Feb. 8, 1994

[51] Int. Cl.⁶ .................................................. H04N 1/024
[52] U.S. Cl. .......................... 358/473; 358/471; 382/313
[58] Field of Search ............................... 250/234; 492/30, 492/36, 39, 59; 301/36.1, 13.1, 13.2; 358/473, 474, 471, 400; 382/59; 271/314, 119, 109

[56] References Cited

U.S. PATENT DOCUMENTS

| | | | |
|---|---|---|---|
| 3,541,248 | 11/1970 | Young | 358/473 |
| 4,089,378 | 5/1978 | Suzuki | 271/314 |
| 4,523,235 | 6/1985 | Rajchman . | |
| 4,707,747 | 11/1987 | Rockwell, III . | |
| 4,785,357 | 11/1988 | Dreyfus et al. | 358/473 |
| 4,925,250 | 5/1990 | Sorrentino et al. | 301/36.1 |
| 4,928,183 | 5/1990 | Yajima | 358/473 |
| 4,959,871 | 9/1990 | Mori et al. | 358/473 |
| 5,156,388 | 10/1992 | Morita | 271/109 |
| 5,301,243 | 4/1994 | Olschafskie et al. | 358/473 |
| 5,306,908 | 4/1994 | McConica et al. | 358/473 |

FOREIGN PATENT DOCUMENTS 0256440  10/1989  Japan ................................. 271/119

*Primary Examiner*—Edward L. Coles, Sr.
*Assistant Examiner*—Fan Lee
*Attorney, Agent, or Firm*—Townsend and Townsend and Crew

[57] ABSTRACT

A rigid cylindrical roller for use in portable optical scanners. The roller includes a thinned midsection and a plurality of grooves. A plurality of compressible, surface gripping rings are fitted onto the plurality of grooves. Each surface gripping ring is held relatively immobile with respect to one another as well as to the roller. In one embodiment, the roller, the grooves, and the compressible rings are dimensioned such that in use, the surface-gripping rings are compressed inside the grooves at the points of rolling contact, permitting both the roller and the rings to come into contact with the scanned surface.

12 Claims, 5 Drawing Sheets

ROLLER FOR OPTICAL SCANNER

BACKGROUND OF THE INVENTION

The present invention relates generally to portable optical scanners and more specifically to rollers for use in portable optical scanners.

Portable optical scanners convert graphical and textual information on a printed page, a photograph, and the like into digital information for use by computers. To capture an image, a user passes a portable optical scanner over the surface of the image to be scanned. A special reading head associated with the scanner scans the image and converts the light reflected from the image into digital information. Rollers in the scanner maintain a relatively constant gap between the reading head and the scanned surface, and permit the scanner to be rolled instead of dragged across the scanned surface. The digital information from the scanner's reading head is then manipulated to reconstruct a digital representation of the scanned image. The digital representation of the image can then be manipulated, stored, or utilized.

Because portable optical scanners are designed to be relatively compact, there will be situations where the size of the image to be scanned exceeds the width of the reading head. To capture the entire image using a portable optical scanner, the user must capture the image portion by portion by making multiple passes with the scanner over the surface of the area to be scanned. Each pass captures a strip of the area to be scanned. Special software is then used to assemble the various scanned strips and to reconstruct a digital image of the entire scanned area.

Some times, the area to be scanned may be a single column of text or newsprint. In this situation, the portable optical scanner may be utilized to capture the column of text by making a single pass down the column. If the scanner is rolled straight down the column, the desired column or strip is captured. If the scanner swerves off the desired strip or column even momentarily, a portion of the area to be captured may be lost.

There is desired an improved roller which permits a portable optical scanner to roll freely over a scanned surface in a linear manner. The improved roller should resist any weaving motion of the portable optical scanner in any direction other than the desired straight-line direction. The improved roller should be relatively lightweight and inexpensive to manufacture. Such an improved roller would materially improves the utility of the portable optical scanners and the quality of the digital image.

SUMMARY OF THE INVENTION

The present invention relates to an apparatus for use as a roller in portable optical scanners. The improved roller of the present invention advantageously improves straight line tracking by resisting any nonlinear or weaving motion of the portable optical scanner.

In one embodiment, the improved roller comprises at least one axle, a rigid shank, and four surface gripping annular rings mounted thereon. The surface gripping annular rings maintain contact with the scanned surface during use and are held relatively immobile relative to the shank.

In another embodiment, the improved roller comprises at least one axle and a rigid shank having a thinned midsection. Grooves in the shank hold the surface gripping annular rings on the shank. The midsection of the shank is thinned to reduce the influence of uneven surfaces, imperfections and irregularities on the roller cylindrical surface, and/or debris in the scanning path. The rings are compressed in use to permit both the shank and the rings to come into contact with the scanned surface.

In yet another embodiment, the improved roller comprises at least one axle, a rigid shank having a thinned midsection, and six surface gripping annular rings.

A further understanding of the nature and advantages of the invention may be realized by reference to the remaining portion of the specification and the attached drawings.

DESCRIPTION OF THE SPECIFIC EMBODIMENTS

Figure 1:
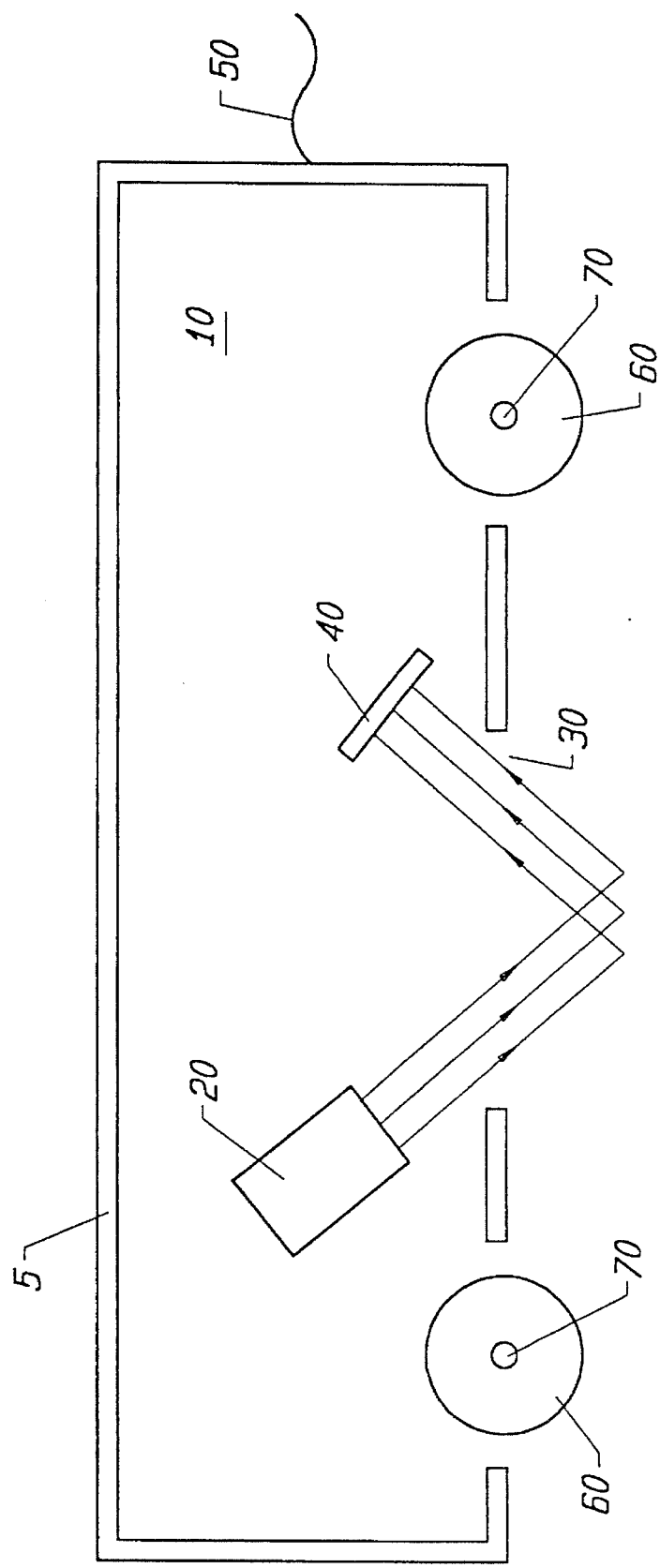
FIG. 1 is a simplified drawing of a representative portable optical scanner.

FIG. 1 is a simplified drawing of a representative portable optical scanner. A portable optical scanner 10 includes an outer shell 5 enclosing an illumination source 20. Illumination source 20 represents a diode, a light bulb, and the like. An aperture 30 in shell 5 permits the light from illumination source 20 to illuminate the area to be scanned. Illumination source 20 is set at a 45-degree angle relative to the surface to be scanned. Light from illumination source 20 is projected through aperture 30 and reflected back to an array of light sensitive photosensors 40. Photosensor array 40 is preferably an array of charged coupled device elements or photodiodes, capable of converting the reflected light into digital image data to be processed by scanner 10 and/or transmitted via transmission wire 50 to a computer.

Some portable optical scanners utilize mirrors, light shields, vary the angles of the incident and reflected light, or a combination of these techniques to improve the quality of the light reflected onto the photosensor array. For the purpose of this invention, it is immaterial how the reflected light from illumination source 20 is received by photosensor array 40 as long as light reflecting off the image below aperture 30 is received by photosensor array 40 and converted into digital image data.

Figure 2:
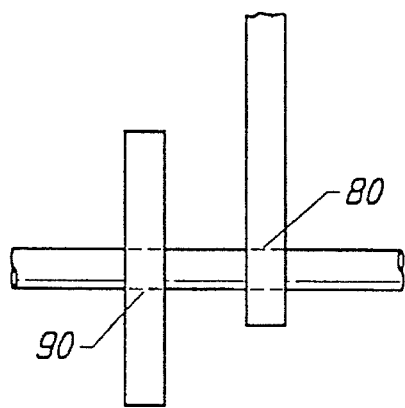
FIG. 2 is a simplified drawing of a representative roller.
Figure 2:
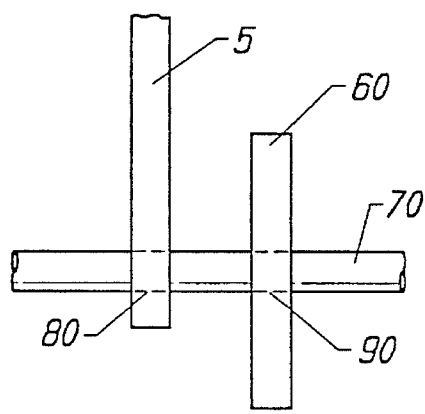

Scanner 10 also includes a set of wheels 60. Each wheel 60 is rotatively mounted on an axle 70 to permit scanner 10 to roll over the scanned surface in a direction transverse to the axis of axle 70. FIG. 2 shows in greater detail the operation of axle 70 and wheel 60. Axle 70 is immovably attached to shell 5 through bore 80. Wheel 60 is rotatively mounted on axle 70 though slot 90 in a manner so as to permit wheel 60 to rotate freely about axle 70 and to permit scanner 10 to roll in the direction of wheel rotation.

Figure 3:
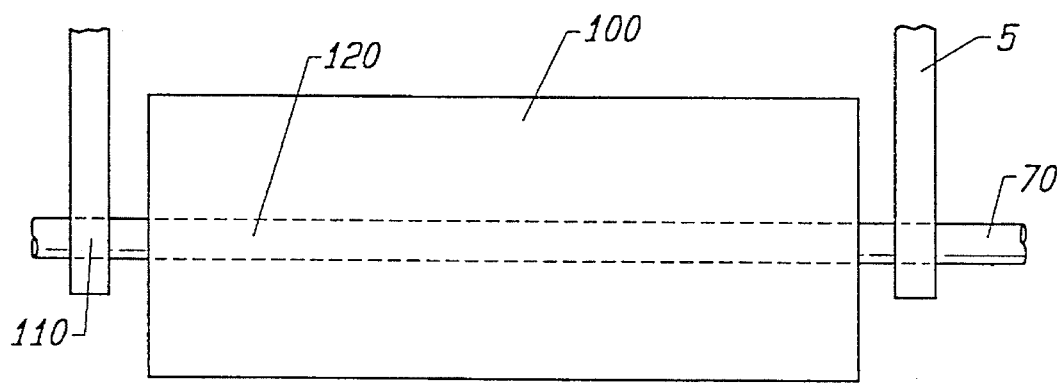
FIG. 3 is a simplified drawing of another representative roller.

FIG. 3 shows a representative roller for use with portable optical scanners. A cylindrical member 100 is immovably attached to axle 70. Axle 70 is rotatively attached to shell 5 through bore 80 in a manner so as to permit axle 70 to rotate freely within bore 80. Being immovably attached to axle 70, cylindrical member 100 will rotate as axle 70 rotates, thereby permitting the scanner to roll in the direction of cylinder rotation.

Figure 4:
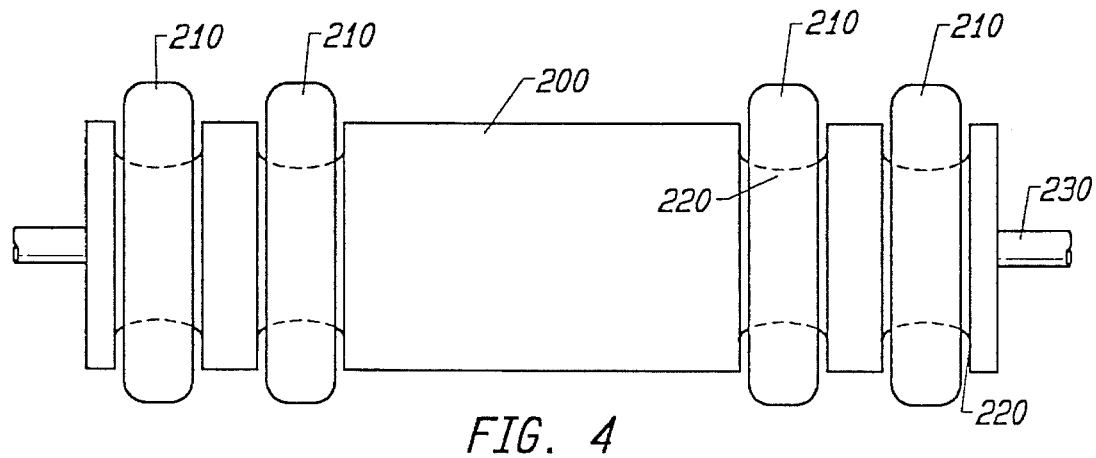
FIG. 4 is a representative drawing of an improved roller according to one embodiment of the present invention.

FIG. 4 shows an improved roller according to one embodiment of the present invention. The improved roller consists of a shank 200 and four surface gripping annular rings 210 attached to shank 200. Shank 200 may be made of a variety of material, including metal. For ease of manufacturing and to reduce cost, any type of plastic, thermoplastic, or polycarbonate compound of a suitable degree of rigidity under service condition may also be chosen. Ring 210 is made from a variety of surface gripping material such as rubber, plastic, and the like. The material forming ring 210 is selected primarily for their high coefficient of friction relative to paper or to a given scanned surface.

Shank 200 has four of grooves 220. Ring 210 is dimensioned such that the major or outer diameter of ring 210 is larger than the major or outer diameter of shank 200. When a downward force is applied to the roller, including shank 200 and rings 210, such as the case when the scanner is in use, rings 210 are compressed inside grooves 220 at the points of rolling contact. The dimensions of rings 210, grooves 220, and shank 200 are chosen such that under compression, both rings 210 and shank 200 come into contact with the scanning surface. Furthermore, the dimensions of rings 210, grooves 220, and shank 200 are chosen such that rings 210 are held relatively immobile relative to shank 200 in grooves 220. In other words, there is almost no rotational or lateral movement of ring 210 and shank 200 relative to one another. Since each ring 210 is held relatively immobile with respect to shank 200, each ring 210 is also held immobile with respect to one another.

Because cylindrical shank 200 is rigid and noncompressible, the cylindrical shape of the roller is preserved under compression, and a straight scanning path is ensured. Furthermore, the contacts between surface gripping rings 210 and the scanned surface increase the amount of friction between the roller and the scanned surface, thereby improving control.

Attached to each end of shank 200 is an axle 230. Axle 230 likewise may be made of a variety of material, including metal, plastic, thermoplastic, or polycarbonate compounds. It is possible to form shank 200 and groove 220 as one piece during manufacture through coating, molding, or like process. It is also possible to form shank 200, groove 220, and axle 230 as one piece. Although the choice is arbitrary, shank 200 of the present embodiment is made of rigid polycarbonate, and axle 230 is formed of stainless steel. As may be seen in FIG. 4, one axle may be longer than the other to facilitate attachment of an optical encoding device of the type well known in the art. Optical encoders keep track of the radial position of shank 200 for use by the computer.

Figure 5:
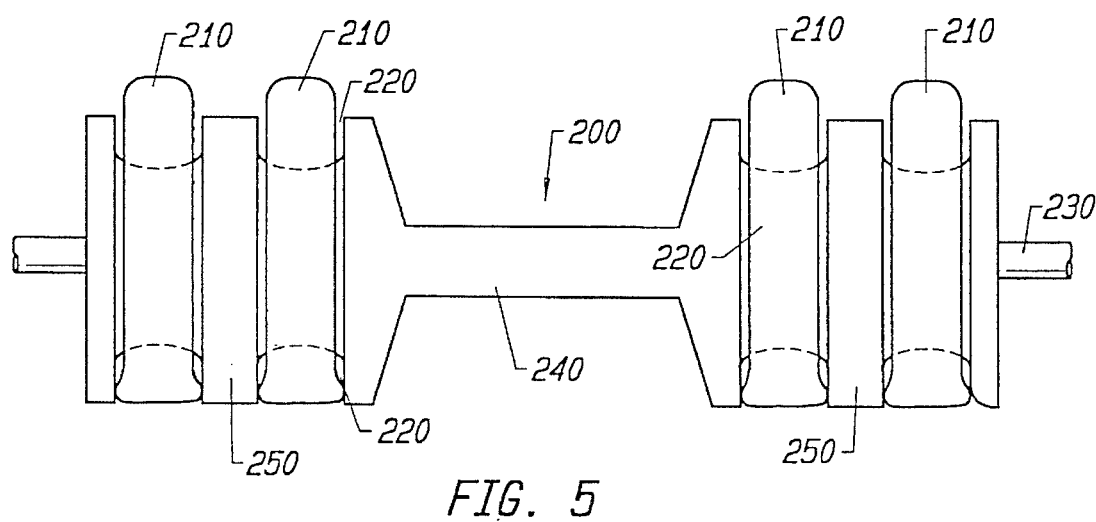
FIG. 5 is a representative drawing of an improved roller according to another embodiment of the present invention.

FIG. 5 shows another embodiment of the present invention. A shank 200 includes a thinned midsection 240. Each portion 250 of shank 200 has two grooves 220 housing two surface gripping annular rings 210. As shown in FIG. 5, there is an axle 230 attached to each end of shank 200. Similar to the roller discussed in connection with FIG. 4, shank 200 including reduced portion 240, and grooves 220 may be formed as one piece during manufacture by casting, molding, or like process. Although the embodiment of FIG. 5 contemplates that each end of shank 200 has one axle immovably attached thereto, it is also possible to have one common axle 230 running through the entire longitudinal length of shank 200 about which shank 200 rotates. If desired, the entire assembly of FIG. 5 save rings 210 may be casted or molded as one piece. Although the choice is somewhat arbitrary, the embodiment of FIG. 5 has shank 200 made of translucent plastic, ring 210 made of surface gripping black rubber, rigid and axle 230 made of stainless steel.

Thinned midsection 240 has particular advantages. A cylindrical roller such as the roller described in FIG. 3 would ride over each and every surface irregularity or obstacle in its scanning path. Each time the roller rides over an obstacle, the distance between the image to be scanned and the scanner's photosensor array changes. This deviation affects the precision of the scanning process and degrades the quality of the resultant digital image. Furthermore, some optical scanners are designed to work best with minimal interference from ambient light. When the scanner lifts off the scanned surface, even temporarily, ambient light affects the amount of light the scanner's photosensor array receives to the detriment of the resultant digital image.

The improved roller of the present invention includes a thinned midsection 240 between adjacent portions 250 to reduce the influence of uneven surfaces, imperfections and irregularities on the roller cylindrical surface, and/or debris in the scanning path. Thinned midsection 240 permits a portion of roller 200 to pass over the scanned surface, thereby reducing the portion of roller 200 that actually comes into contact with the scanned surface. Consequently, some obstacles along the scanning path may be avoided. Image quality is thereby enhanced since thinned midsection 240 reduces the probability of roller 200 encounters and rides over an obstacle in the scanned path.

FIG. 5 also shows rings 210 in their compressed state. The compression occurs when the user exerts a downward force on the roller during use. When compressed, rings 210 are flush with portions 250 at the points of rolling contact. Consequently, both rings 210 and portions 250 come into contact with the scanning surface during scanning.

Figure 6:
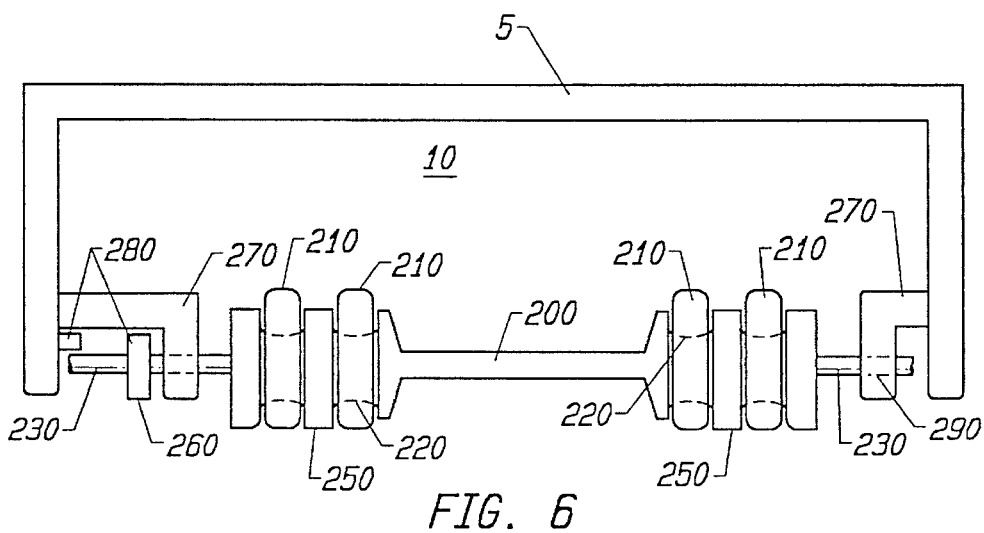
FIG. 6 is a simplified drawing of an improved roller in a portable optical scanner.

FIG. 6 shows an improved roller of the present invention mounted in a portable optical scanner. For aesthetic reasons, shell 5 of a portable optical scanner includes internal flanges 270 for mounting the improved roller. Each axle 230 of the improved roller is rotatively mounted on flange 270 such that axle 230, along with shank 200 and surface gripping annular rings 210, is permitted to rotate freely as one unit. As shown in FIG. 6, the improved roller is mounted such that, in use, only a portion of roller 200 and rings 210 protrude from the bottom of scanner 10 to make contact with the surface to be scanned. Although not necessary for the purpose of the present invention, FIG. 6 also shows a representative optical positional encoder 280 mounted on axle 230. Encoder 280 may be chosen from a variety of widely available and well known shaft mounted optical position encoders. Although only one improved roller is shown in FIG. 6, it is contemplated that multiple rollers may be used in a portable optical scanner. In fact, it is a common practice to use two rollers per scanner to improve stability and tracking.

Figure 7:
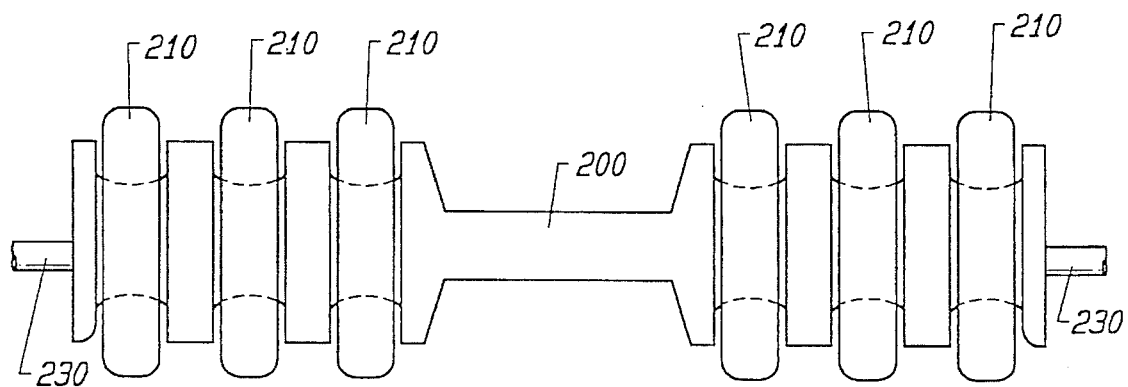
FIG. 7 is a representative drawing of an improved roller according to yet another embodiment of the present invention.

FIG. 7 shows a variation of the embodiment described in connection with FIG. 5. The improved roller of FIG. 7 has a total of six or 3 sets of surface gripping annular rings 210. In use, the six surface gripping annular rings provide six points of contact with the scanned surface instead of four. FIG. 7 is included herein to point out that while four rings 210 per roller are considered the optimal number, it is possible to utilize more than four rings 210 per roller without departing from the scope and spirit of the present invention.

Figure 8:
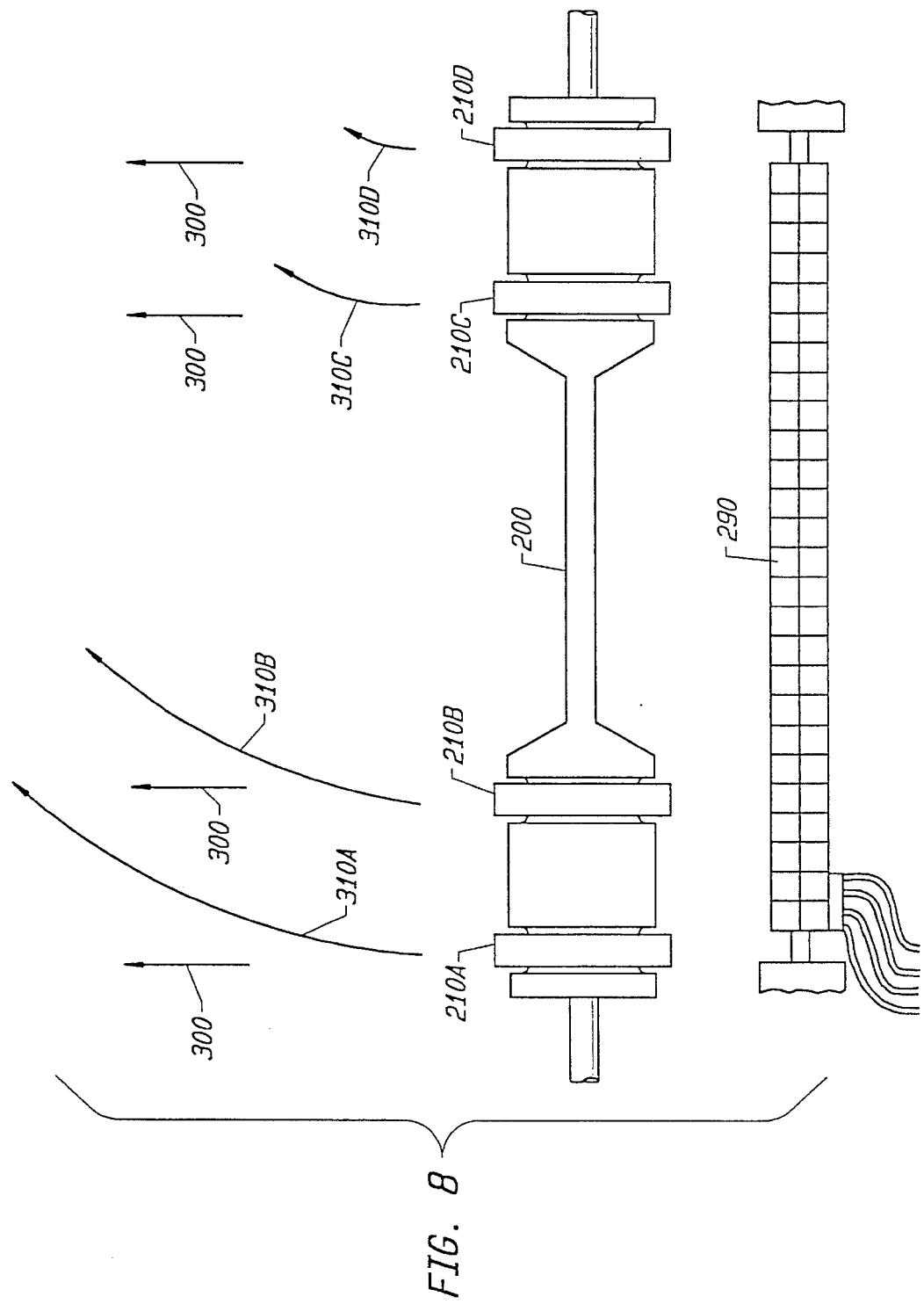
FIG. 8 illustrates the operation of the improved roller according to one embodiment of the present invention.

The operation the improved roller is described in reference to FIG. 8. To scan an image, a portable optical scanner is set on the scanned surface so that surface gripping annular rings 210 come into direct contact with the scanned surface. The scanner is then permitted to roll, by pushing or pulling on the scanner, in a direction transverse to the longitudinal axis of the roller. As the scanner travels along in a straight line, a rectangular strip of the image, having as its width the width of a photosensor array 290 and as its length the travelled distance, is scanned. If the width of the image is larger than the width of photosensor array 290, many parallel passes may be made to scan the entire image.

Ideally, the user should apply force only in the direction of ring rotation to move the scanner in a straight line or linear manner. When this happens, a rectangular strip of the image is scanned with each pass. In practice, it is unrealistic to expect human users to apply a consistently linear force to maintain a consistent linear motion. Unaided, the scanner will have a tendency to follow any deviation introduced by the human hand. Instead of travelling in the desired linear direction as indicated by arrows 300, scanner 10 may be inadvertently urged to swerve, for example, in the direction indicated by arrows 310.

In this situation, if rings 210(a)–(d) were permitted to rotate freely and independently of each other, ring 210(a), being on the outside of the turn, would have to complete more rotations than inner ring 210(d) in order for the roller to turn in the direction indicated by arrows 310. Furthermore, if rings 210(a)–(d) were permitted to rotate freely and independently of each other, there would be little resistance to the weaving motion: each ring 210(a)–(d) would freely rotate to travel a respective distance 310(a)–(d) to complete the turn.

However, rings 210(a)–(d) of the present invention are held relatively immobile with respect to shank 200. Consequently, rings 210(a)–(d) cannot rotate independently of each other. Furthermore, as ring 210(a) rotates, it imparts a torsional force on shank 200. This torsional force is transmitted by relatively rigid shank 200 to rings 210(b)–(d). Consequently, rings 210(b)–(d) are urged rotate at the same rate as ring 210(a). In fact, ring 210(a)–(d), being relatively immobile with respect to shank 200, must rotate at the same rate, if at all. Because rings 210(a)–(d) must rotate at the same rate, linear motion of the scanner is maintained.

As discussed earlier, each of rings 210(a)–(d) is formed of a surface gripping material. The high coefficient of friction between ring 210 and the scanned surface prevents ring 210 from skipping or sliding over the scanned surface. Consequently, rolling contact between each of rings 210(a)–(d) and the scanned surface is preserved. A ring 210 must rotate to move across the scanned surface, with the result that torsional force is imparted on shank 200 urging all other rings on shank 200 to rotate in unison. When all rings rotate at the same rate, straight line tracking is maintained.

With prior art all-elastomer rollers, uneven downward forces on the roller may compress a compressible rolling cylinder unevenly, causing the compressible roller to assume a cone shape and a circular rolling path. The roller of the present invention employs a rigid, noncompressible shank 200 and portions 250. Being rigid and noncompressible, the cylindrical roller, including shank 200 and portions 250, does not compress when the user applies a downward force. Consequently, portions 250 maintain their cylindrical shape and equal radii under compression by the user. Furthermore, the cylindrical shape and equal radii of portions 250 are maintained even if the user exerts uneven pressures on the roller.

In one embodiment, rings 210 are compressed in grooves 220 in response to a moderate downward force on the roller. Portions 250, rings 210, and grooves 220 are dimensioned such that when compressed, the compressed portion of rings 210 are flush with the rolling surface of portions 250 at the points of rolling contact. In use, the compression of rings 210 permits both surface-gripping rings 210 and portions 250 to come into contact with the scanned surface. Thus, the rigid, noncompressible cylindrical portions 250 ensures a cylindrical roller and a straight scanning path even if uneven pressures are applied to the roller. The high-friction, compressible rings grip the scanning surface, thereby improving control and straight-line tracking.

It will be understood that the foregoing is merely illustrative of the principles of the invention, and that various modifications can be made by those skilled in the art without departing from the scope and spirit of the invention. Accordingly, the foregoing disclosure is intended to be illustrative, but not limiting, of the scope of the invention which is set forth in the following claims.

What is claimed is:

1. A roller for use in portable optical scanners, comprising:

a shank;

at least four surface gripping annular rings coupled to said shank; and axle means coupled to said shank for permitting said shank to rotate freely about said axle means;

wherein said shank has a plurality of grooves and each of said rings is partially disposed in one of said grooves such that when said rings are compressed against a scanned surface both said rings and said shank come into contact with said scanned surface.

2. A roller for use in portable optical scanners, comprising:

a shank;

at least four surface gripping annular rings coupled to said shank; and axle means coupled to said shank for permitting said shank to rotate freely about said axle means;

wherein said rings are held relatively immobile with respect to said shank;

wherein said shank has a plurality of grooves and each of said rings is partially disposed in one of said grooves;

wherein said shank has a thinned midsection;

wherein said shank, including said grooves and said thinned midsection, is made of plastic and formed as one piece;

wherein said rings are made of rubber.

3. A roller for use in portable optical scanners comprising:

a shank;

at least four surface gripping annular rings coupled to said shank; and axle means coupled to said shank for permitting said shank to rotate freely about said axle means;

wherein said rings are held relatively immobile with respect to said shank;

wherein said shank has a plurality of grooves and each of said rings is partially disposed in one of said grooves;

wherein said shank has a thinned midsection;

wherein said shank, including said grooves and said thinned midsection, is made of plastic and formed as one piece;

wherein said shank, said rings, and said grooves are dimensioned such that when said rings are under compression against a scanned surface, both said rings and said shank come into contact with said scanned surface.

4. A roller for use in portable optical scanners, comprising:

a plurality of surface gripping rings;

a shank means for mounting said plurality of surface gripping rings; and axle means for permitting said shank means to rotate freely within the portable optical scanner;

wherein said shank means includes a plurality of grooves for partially housing said plurality of surface gripping rings on said shank means;

wherein said shank means, said grooves, and said rings are dimensioned such that in use, said rings are compressed against a scanned surface in said grooves permitting both said rings and said shank to come into contact with said scanned surface.

5. A hand held optical scanner for scanning an image, comprising:

a housing;

an illumination source mounted in said housing;

a photosensor mounted in said housing at a position in the path of light generated from said illumination source and reflected from an image to be scanned;

a shank;

two axles coupled to said shank and said housing; and at least four surface gripping annular rings mounted on said shank;

said shank and axles extending across the majority of a width of said housing.

6. The scanner of claim 5 wherein said shank has a thinned midsection.

7. The scanner of claim 6 wherein said rings are made essentially of rubber.

8. The scanner of claim 7 further comprising means, coupled to said roller means, for measuring the movement of said roller means.

9. The scanner of claim 6 wherein said shank has at least four grooves, and each of said rings being partially disposed in one of said four grooves.

10. The scanner of claim 9 wherein said rings are held relatively immobile in said grooves.

11. The scanner of claim 9 wherein said shank, said grooves, and said rings are dimensioned such that in use, said rings are compressed in said grooves, permitting said rings and said shank to come into contact with said surface of the image to be scanned.

12. The hand held optical scanner of claim 5 wherein said four rings are arranged in two pairs, each pair being adjacent one of said axles, the distance between said pairs being greater than a distance between two rings in a pair.

* * * * *